J. Z. TOW & J. F. LEMONS.
POWDER DISTRIBUTER.
APPLICATION FILED OCT. 24, 1914.
1,182,118.
Patented May 9, 1916.
3 SHEETS—SHEET 3.
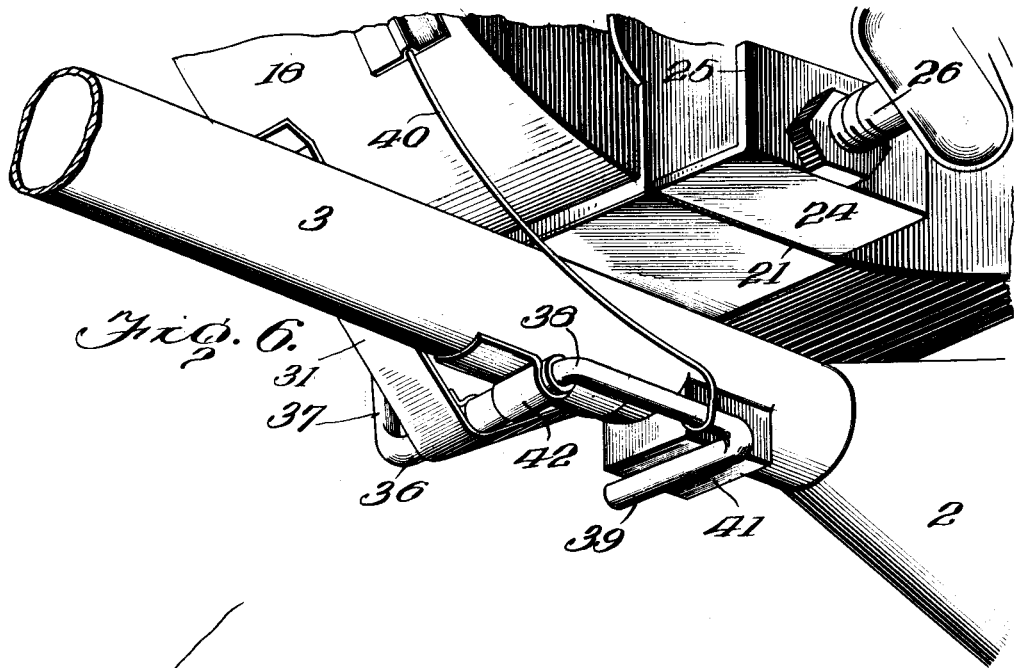
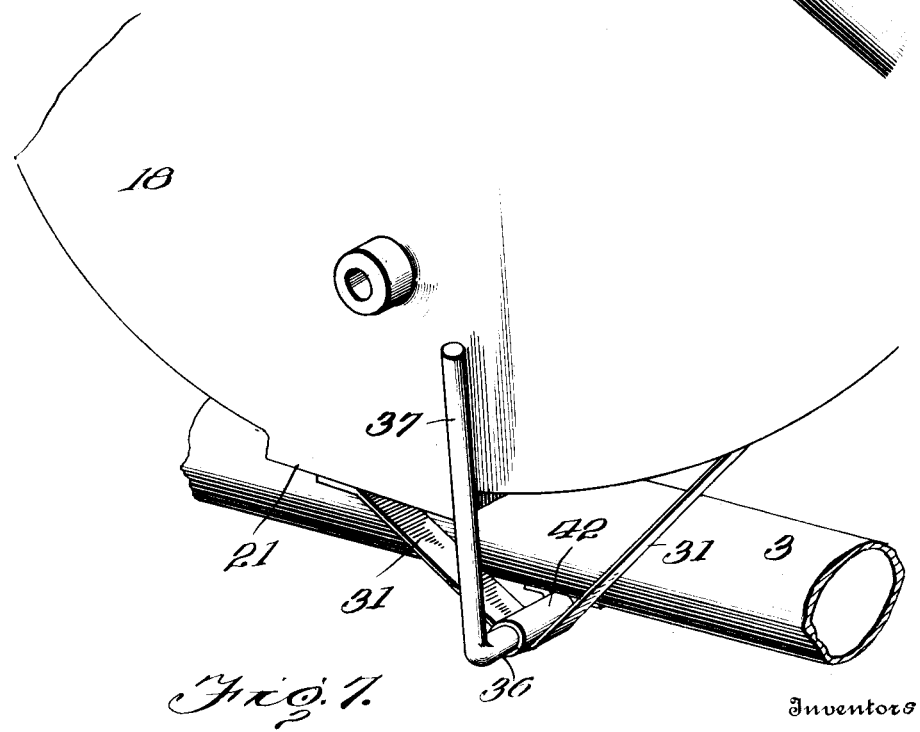

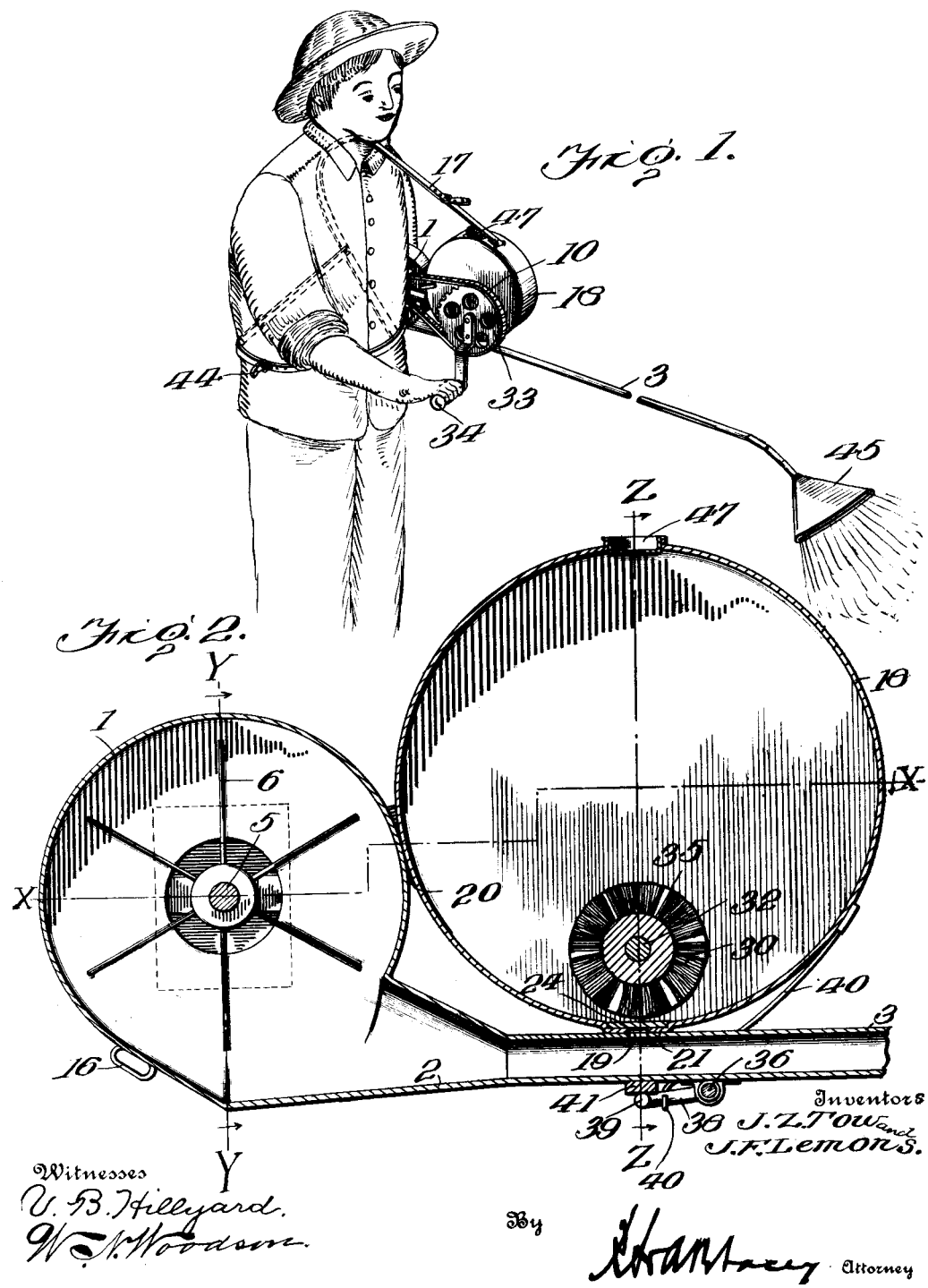

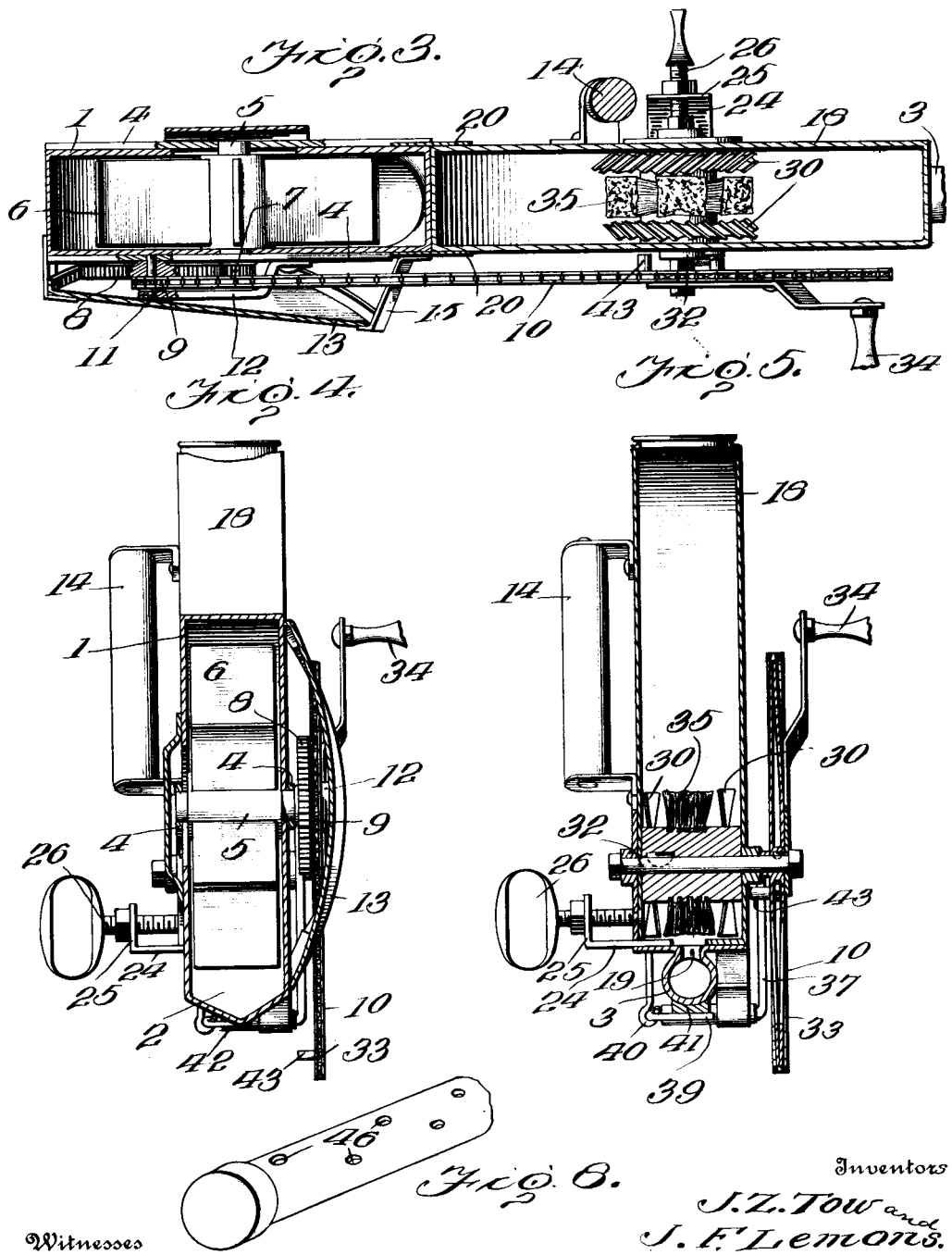

UNITED STATES PATENT OFFICE.

JOHN Z. TOW AND JOSEPH F. LEMONS, OF CEDAR HILL, TENNESSEE.

POWDER-DISTRIBUTER.

1,182,118.   Specification of Letters Patent.   Patented May 9, 1916.

Application filed October 24, 1914. Serial No. 868,441.

*To all whom it may concern:*

Be it known that we, JOHN Z. Tow and JOSEPH F. LEMONS, citizens of the United States, residing at Cedar Hill, in the county of Robertson and State of Tennessee, have invented certain new and useful Improvements in Powder-Distributers, of which the following is a specification.

This invention has relation to the type of devices intended more particularly for distributing pulverulent material in a finely divided state, and used chiefly for applying powder of a nature to destroy insects and abnormal growths upon trees, plants and the like.

The invention aims to provide a device of the character hereinbefore stated which may be conveniently carried and easily operated and which will insure a positive and thorough dissemination of the pulverulent material to be distributed when spraying plants, shrubs, trees, and the like for killing insects, fungi, etc.

A further object of the invention is the provision of a powder distributer embodying a hopper or container for the powder and a blast-creating mechanism, the two being so arranged as to provide a structure of compact form, of minimum size and adapted to be conveniently carried and manipulated.

A further object of the invention is to combine with the device novel means for preventing the banking of powder in the hopper or the discharge pipe, said means being in the form of a knocker to impart a jar at stated intervals so as to loosen and start the powder and insure a positive delivery thereof from the hopper to the discharge pipe.

The invention also has for its object to provide a plate which is arranged in a manner to protect a part of the operating mechanism and which is so shaped as to conform to the side of the operator and obtain an extended bearing against his side without producing injurious or annoying pressure against the body of the operator when the device is in service.

A still further purpose of the invention is the provision of a device of the character hereinbefore specified involving a novel construction and arrangement of parts, whereby a strong blast of air is created and adapted to be applied for distributing the powder in a cloud or spray, so as to secure the best results in destroying insects or abnormal growths on plants, shrubs, and trees, said device embodying novel actuating means for driving the blast-creating device and the agitator, whereby a positive feed of the powder is assured.

The invention furthermore has for its object to provide a device of the nature hereinbefore stated embodying a novel construction and arrangement of parts such as set forth hereinbefore and more particularly claimed and illustrated in the drawings hereto attached in which:—

Figure 1 is a perspective view showing a powder distributer embodying the invention and in operative position. Fig. 2 is a vertical central longitudinal section, a portion of the discharge pipe being broken away. Fig. 3 is a horizontal section of the complete device on the line $x$—$x$ of Fig. 2. Fig. 4 is a transverse section on the line $y$—$y$ of Fig. 2. Fig. 5 is a transverse section on the line $z$—$z$ of Fig. 2. Fig. 6 is a detail view in perspective showing more clearly the knocking mechanism for imparting a jar to the powder to prevent banking of the same and to insure a positive delivery thereof and the means for regulating the discharge of powder from the hopper or container. Fig. 7 is a detail perspective view of a portion of the container. Fig. 8 is a detail view of a modified form of nozzle to be fitted to the delivery end of the discharge pipe.

Corresponding and like parts are referred to in the following description and indicated in all the views of the accompanying drawings by the same reference characters.

In accordance with the invention a suitable hopper or container is provided for receiving the powder or pulverulent material to be distributed and associated with such hopper or container is an air-blast-creating device which may be of any approved type, the purpose being to insure a distribution of the powder in a cloud or finely divided state so as to envelop or settle upon the trees, plants, shrubs, or the like to be treated for destroying insects, fungi, or the like.

The air-blast-creating device embodies a casing 1 which, as indicated, is of circular outline and provided with a spout 2, the latter having a tangential arrangement. A delivery pipe 3 is connected to the spout 2 and may be of any length or formed of a number of sections to admit of the delivery pipe being lengthened or shortened, according to the nature of the work in hand. The casing 1 is usually constructed of sheet metal and is reinforced on opposite sides by means of bars 4. A shaft 5 extends centrally through the casing 1 and is mounted at or near its ends in the reinforcing bars 4. A fan 6, of any construction such as commonly employed in blowers, is mounted upon the shaft 5 so as to rotate therewith. One end of the shaft 5 is extended and has a pinion 7 fastened thereto. A gear wheel 8 has its teeth in mesh with the teeth of the pinion 7 and serves to transmit motion thereto for driving the same when the device is in operation. The gear wheel 8 is provided upon one side with a pulley 9 to which motion is imparted by means of a drive chain or belt 10. The gear wheel 8 and pulley 9 are constructed so as to rotate in unison and may be formed in any desired way. A shaft 11 has the gear wheel 8 and pulley 9 fastened thereto and is mounted in one of the reinforcing bars 4 and a bar 12 which is attached at one end to the adjacent bar 4 and has its opposite end portion offset so as to provide a space in which is arranged the gear wheel 8 and pulley 9.

A plate 13 extends over the gear wheel 8, pulley 9, bar 12, pinion 7 and a portion of the drive belt 10. This plate is preferably co-extensive with a side of the casing 1, and is vertically curved between its upper and lower edges, which edges are soldered or otherwise secured to the upper and lower edges of the adjacent side of the casing 1. The plate 13 is arranged at a slight inclination to the adjacent side of the casing 1 so as to incline in a forward direction, this being of advantage to obtain a minimum space between such plate and the adjacent side of the casing 1. The curvature of the plate 13 in a vertical direction conforms approximately to the side of the operator against which such plate bears when the device is in position for use, as indicated most clearly in Fig. 1. In this connection it is observed that when the device is in position for service the casing 1 is arranged so as to bear against the left-side of the operator, the left-hand extending over the device and gripping a handle 14 provided upon the outer side of the hopper or container. A brace 15 connects the forward portion of the plate 13 with the adjacent side of the casing and the spout 2. A loop 16 provided upon the lower portion of the casing 13 is adapted to engage a hook or attaching device at one end of a strap 17 arranged to pass over the left shoulder of the operator, as indicated most clearly in Fig. 1.

The hopper or container for the powder or other pulverulent insecticide or fungicide is designated by the reference numeral 18 and as hereinbefore stated may be of any construction or capacity. In the preferable construction the hopper 18 is of circular form, as shown, thereby presenting a neat appearance and possessing a compact arrangement. As indicated, the hopper or container 18 is mounted upon the inner portion of the delivery pipe 3 which is permanently attached to the spout 2, and is provided in its bottom with an opening 19 for the discharge of the material. The sides of hopper are preferably parallel. The rear wall of the hopper is preferably in contact with the circumferential wall of the casing 1 and is attached thereto in any manner, preferably by means of cleats 20 which are soldered to the sides of the hopper and the casing. The lower portion of the outer wall of the hopper is depressed, as indicated at 21 to receive a slide 24. This slide controls the discharge of the material through the opening 19 into the delivery pipe 3. The hopper is mounted upon the delivery pipe and secured thereto in any substantial manner. The slide 24 is adjustable transversely of the hopper so as to regulate the size of the discharge opening. Any suitable means may be employed for adjusting the slide and holding the same in the adjusted position. For convenience, the slide 24 is shown as provided at its outer end with an upturned end 25 which is reinforced and formed with an internally threaded opening in which is mounted an adjusting screw 26, the inner end of such adjusting screw being connected by means of a swivel joint with the hopper. Adjustment of the slide 24 is effected by turning the screw 26, the slide being moved in or out according to the direction of rotation of the adjusting screw.

A shaft 32 extends transversely through the lower portion of the hopper or container 18 and is mounted in bearings provided upon the side walls thereof. One end of the shaft 32 projects beyond the side of the hopper and has a pulley or drive wheel 33 secured thereto, the outer edge of such pulley or drive wheel being toothed to receive the drive-chain 10. The drive wheel 33 may be of any construction and is provided with a handle 34, which is grasped by the operator when the device is in operation. The drive-chain 10 passes around the pulley 9 and drive wheel 33 and transmits motion from the latter to the pulley. A rotary brush 35 is mounted upon the shaft 32 and rotates therewith within the lower portion of the hopper or container 18. The rotary brush 35 acts as an agitator and moreover, breaks up lumps and insures a delivery of the powder in a finely divided state. The shaft 32 is arranged in a vertical line with the discharge opening 19 and the rotary brush 35 is of such a diameter as to bring its lower portion in position to sweep over the discharge opening 19 with the result that a positive feed of the powder is assured. Fan wheels 30 are located at the sides of the rotary brush 35 and are secured to the shaft 32 so as to rotate therewith. These fan wheels serve to loosen the material and act jointly with the brush 35 to agitate and insure a positive feed of the material.

The powder found most beneficial for destroying insects and fungi is arsenate of lead and, as is well known, such material has a tendency to cling or bank and for this reason it has been found expedient to provide a mechanism for imparting a jar to loosen the powder and assure its being taken up by the blast of air and distributed in a cloud or finely divided state. For this purpose, a knocker has been devised and is mounted upon the delivery pipe 3, such knocker embodying a shaft 36, opposed arms 37 and 38 and a reëntrant arm 39, the latter extending parallel with the shaft 36 and projecting beneath the delivery pipe 3. The arm 38 is adapted to be engaged by the free end of a spring 40 which is attached at its opposite end to the delivery pipe 3. The reëntrant arm 39 constitutes a hammer since it delivers a blow upon the delivery pipe which imparts a jar for loosening the powder and preventing the banking of the same. The delivery pipe is reinforced or provided with a blow-receiving portion 41 which sustains the impact of the hammer 39 when the same delivers its blow. The shaft 36 is mounted in a bearing 42 attached to the under side of the delivery pipe 3 and having its end portions projecting beyond opposite sides of the delivery pipe. A brace 31 is attached at a middle point to an end of the bearing 42 and its end portions extend upwardly and outwardly and are attached to the hopper 18. The arm 37 partakes of the nature of a trip and extends across the path of one or more tappets 43 projecting laterally from the drive-wheel 33. The spring 40 is of such strength as to insure the delivery of a blow when the knocker is actuated to loosen the powder and prevent any tendency of the same to bank or accumulate in the delivery pipe or lower portion of the hopper. The knocker is so arranged as to insure delivery of the blow about in vertical line with the discharge opening 19 it having been found that the delivery of the blow at such point gives the best results in assuring the loosening and a positive delivery of the powder. Thus any tendency of the material to accumulate in the discharge pipe is prevented by the repeated jars due to the blows of the hammer directly upon the pipe. These jars are transmitted to the delivery portion of the container because of the nearness of the point of delivery of the blows thereto, hence the material is prevented in a measure from collecting at the discharge opening.

The device is adapted to be attached to the body of the operator by means of a suitable harness which in the present instance consists of the shoulder strap 17 and a body strap 44. One end of the shoulder strap 17 is attached to the rear portion of the casing 1 and the opposite end is connected with the forward portion of the hopper 18. This strap 17 is adapted to be lengthened or shortened in the usual way by means of a buckle, and in practice is adapted to pass over the left shoulder of the operator. The body strap 44 is attached at one end to the rear portion of the shoulder strap 17 and its free end is provided with a hook or attaching device which is adapted to engage the loop 16. The body strap 44 is likewise adapted to be lengthened or shortened, and in practice passes around the torso or body of the operator.

The delivery pipe 3 may be of any length and preferably comprises sections which are adapted to be connected by means of a slip joint. The discharge end of the delivery pipe 3 may be provided with an outlet of any nature best adapted to the peculiar work in hand. As shown, the outer end or section of the delivery pipe is provided with a flattened fan-shaped nozzle 45 for spreading the material. In the modified form of nozzle shown in Fig. 8 it is provided in its length with a plurality of openings 46 which have a staggered arrangement and are preferably of circular formation. It is to be understood that a discharge of any formation for the powder may be provided.

In the operation of the device the pulverulent material of any nature whatsoever to be distributed is placed within the hopper or container 18 and for convenience such hopper is shown as provided in its upper end with an opening which is normally closed by means of a cap 47. The device when in position, is arranged with the casing 1 opposite the left side of the operator and in contact with the body, the convex side of the plate 13 bearing against the adjacent side of the operator. The strap 17 passes over the left shoulder, whereas the strap 44 extends around the body. The left-hand of the operator grasps the handle 14, thereby steadying the device and enabling the same to be moved within certain limits so as to direct proper delivery of the material. The right hand grasps the handle 34 and is moved so as to impart a rotary movement to the drive wheel 33 which is rotated in a clockwise direction. The fan 6 is rotated in an anti-clockwise direction by reason of the intermediate gearing 7 and 8. As the drive-wheel 33 is rotated the powder contained in the hopper is agitated and caused to feed positively by means of the brush 35 and the fan wheels 30, the latter also serving to break up lumps and cause the powder to be delivered in a loosened state. It will also be understood that in the rotation of the drive wheel 33 the knocker is operated at stated intervals by means of the tappets 43 in the manner stated, the impact of the hammer 39 upon the reinforced portion 41 of the delivery pipe producing a jar sufficient to prevent the banking of the powder. It is further noted that the spout 2 is located at the lower portion of the casing 1 and forms connecting means between such casing and the hopper. The spout is of tapering form, the larger end being in communication with the casing 1 so as to receive the full benefit of the blast of air. The delivery pipe is straight and as a consequence, the blast of air has a ready passage therethrough and picking up powder delivered from the hopper into the pipe, distributes the same in a cloud or spray on the plants, trees, shrubs, or the like, to be treated.

While the drawings illustrate the preferred embodiment of the invention, it is to be understood that various changes in the form, proportion and minor details of the construction may be resorted to within the scope of the invention as claimed, without departing from the spirit thereof.

Having thus described the invention, what is claimed as new is:—

1. In a device of the character set forth, the combination of a delivery pipe, a container mounted thereon, and in communication therewith, a knocker comprising a shaft, a trip arm at one end of the shaft, a second arm at the opposite end of the shaft, and a hammer projecting inwardly from the extremity of the second arm about parallel with the shaft, a bearing provided upon the delivery pipe and receiving the shaft of the knocker which is mounted therein, the knocker being arranged to have the hammer deliver a blow upon the delivery pipe about opposite the communication between such delivery pipe and the container, and actuating means for operating the knocker at stated intervals.

2. In a device of the character set forth, a delivery pipe, means for supplying pulverulent material thereto, a shaft journaled transversely of the delivery pipe and provided at opposite ends with angularly disposed arms, one of such arms constituting a trip, a hammer projecting from the remaining arm parallel with the shaft and adapted to strike a blow upon the delivery pipe and actuating means for the shaft to impart an oscillatory movement thereto.

3. In a device of the character set forth, a delivery pipe, means supplying pulverulent material thereto, a reinforcement upon the delivery pipe in line with the supply of pulverulent material thereto, a shaft mounted upon the delivery pipe and extending transversely thereof, arms at opposite ends of the shaft, one of such arms constituting a trip, a hammer extending inwardly from the remaining arm and adapted to deliver a blow upon the reinforcement applied to the delivery pipe, a spring engaging one of the arms of the shaft, means for intermittently actuating the shaft, and a brace forming a stay for the shaft.

4. A device of the character specified, comprising a fan casing, a delivery pipe in communication therewith, a container mounted upon the delivery pipe and in communication therewith, a fan mounted in the fan casing, a drive wheel mounted on the container, gearing mounted on the side of the fan casing and connected with the said drive wheel to receive motion therefrom, and a plate extending over the gearing mounted upon the fan casing and curved between its upper and lower edges to impart a vertical convexity to the outer face of the plate to conform to the side of the operator when the device is in position.

5. In a device of the character set forth, a fan casing, a delivery pipe in communication therewith, a container mounted upon the delivery pipe, a drive wheel mounted upon a side of the container, a fan arranged within the casing, gearing for operating the fan, mounted on a side of the casing and connected wtih the said drive wheel, and a plate extending over the gearing mounted upon the fan casing and inclined horizontally thereto and curved vertically between its upper and lower edges.

In testimony whereof we affix our signatures in presence of two witnesses.

JOHN Z. TOW. [L. S.]
JOSEPH F. LEMONS. [L. S.]

Witnesses:
B. F. ALLNUTT,
J. E. ADAMS.